United States Patent [19]

Parten

[11] Patent Number: 4,921,513

[45] Date of Patent: May 1, 1990

[54] METHOD OF MANUFACTURING A SKATEBOARD

[75] Inventor: Keith Parten, Ft. Worth, Tex.

[73] Assignee: Nash Manufacturing Company, Fort Worth, Tex.

[21] Appl. No.: 306,391

[22] Filed: Feb. 6, 1989

[51] Int. Cl.[5] .............................................. B32B 31/00

[52] U.S. Cl. .................................... 156/280; 156/153; 156/212; 156/249; 156/277; 180/180; 280/11.19; 280/87.042

[58] Field of Search ............... 156/153, 280, 249, 212, 156/277; 180/180; 280/11.19, 87.042

[56] References Cited

U.S. PATENT DOCUMENTS

| | | | |
|---|---|---|---|
| 3,809,568 | 5/1974 | Askew | 156/277 |
| 3,846,200 | 11/1974 | Soerrling et al. | 156/212 |
| 4,169,005 | 9/1979 | Fogle et al. | 156/280 |

*Primary Examiner*—John J. Gallagher
*Attorney, Agent, or Firm*—Charles D. Gunter, Jr.

[57] ABSTRACT

A method is shown for manufacturing a skateboard having an upper and lower surface. A pre-printed label is applied to the board lower surface by a suitable adhesive so that the outer periphery of the label matches the contours of the board lower surface. The label is then sealed by applying a suitable coating to protect the label.

10 Claims, 2 Drawing Sheets

METHOD OF MANUFACTURING A SKATEBOARD

BACKGROUND OF THE INVENTION

1. Field of the Invention.

The present invention relates to skateboards and specifically to a manufacturing technique for applying a decorative marking to a selected surface of a skateboard.

2. Description of the Prior Art.

Skateboards are, in effect, a single relatively large roller skate having a board on which the user stands and having rollers which support the board to permit the board to travel with the user thereon. Skateboards provide a considerable source of pleasure to the users thereof while at the same time being a source of sporting activity which requires considerable physical skill.

In the past, the skateboard upper surface has normally been provided with a roughened finish to improve traction. This surface could be provided, for instance, by embedding grit or other particulate matter in the coating applied to the upper surface. The upper surface has also included decorative markings at times. The lower surface of the skateboard was normally provided with a smooth finish, allowing more decorative markings to be applied thereto. In a typical prior art technique, a decorative image was applied to the skateboard lower surface by silkscreening the graphics and artwork thereon. Often times, multiple layers were silkscreened onto the board lower surface and the finished image was sealed by applying a lacquer coating. The overall effect of the artwork provided on the board lower surface has proved to be important in the sales appeal of the skateboard.

Despite the overall satisfactory appearance of the decorative markings applied in the prior art, the silkscreened images were not as sharp and well defined as images obtained by conventional printing processes. Also, the multiple step silkscreen application was messy and time consuming, adding to the cost of manufacture.

A need exists for an improved method for applying a decorative marking to a skateboard which would be cheaper and more efficient than the prior art techniques.

Another need exists for such a method which would provide a decorative image on a skateboard surface comparable in quality to the images obtained by conventional offset printing processes.

SUMMARY OF THE INVENTION

In the present method, a skateboard is provided of the type having an upper surface on which the user stands and having a contoured lower surface provided with rollers which support the board to permit the board to travel with the user thereon. The lower surface has a decorative marking applied thereto. In order to apply the decorative marking, a label is applied by means of a suitable adhesive, the label having an outer periphery which matches the contours of the board lower surface so that the labels substantially covers the board lower surface when applied thereto. A sealant coating is then applied to the label and board to protect the label.

Preferably, the label which is applied to the board lower surface is a pre-printed label having a decorative image applied thereto by a conventional printing process. The label is centered on the board lower surface and a compressive force is applied to smooth out and improve the adherence of the label to the board. The board is then sealed by applying a lacquer finish to the label and board to protect the pre-printed label.

Additional objects, features and advantages will be apparent in the written description which follows.

DETAILED DESCRIPTION OF THE INVENTION

Figure 1:
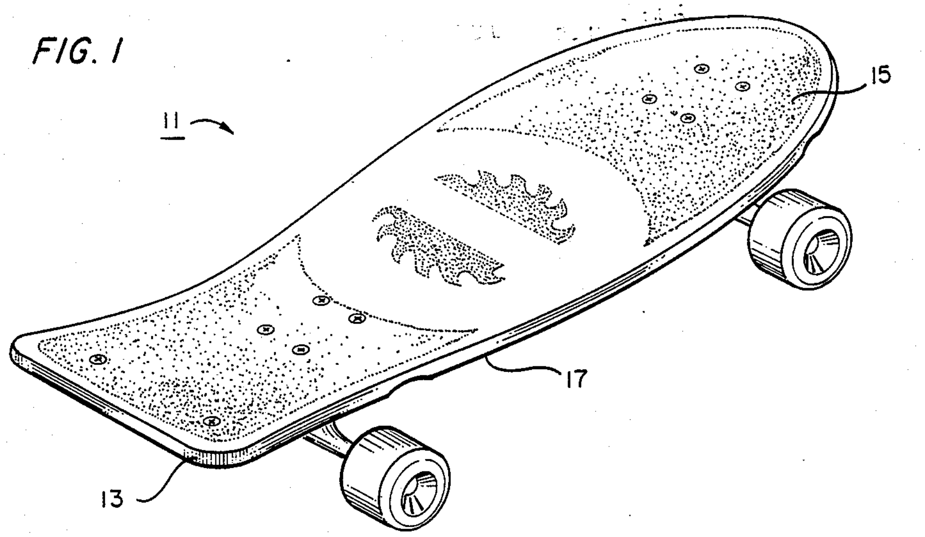
FIG. 1 is a prospective view of a skateboard of the invention showing the upper surface thereof.

Referring now to the drawings, there is shown in FIG. 1 a skateboard 11 manufactured according to the method of the invention. The skateboard 11 includes an elongated board 13 having an upper surface 15 and a lower surface 17. The board 13 can be made of a plastic material of it can be made of metal or wood, as desired. Preferably, the board is of wood. As shown in FIG. 1, the upper surface 15 typically has a roughened surface which can be provided by embedding grit or other particulate matter in the finish coating of the board. Alternatively, the upper surface can have rubber strips or other means for improving traction.

Figure 2:
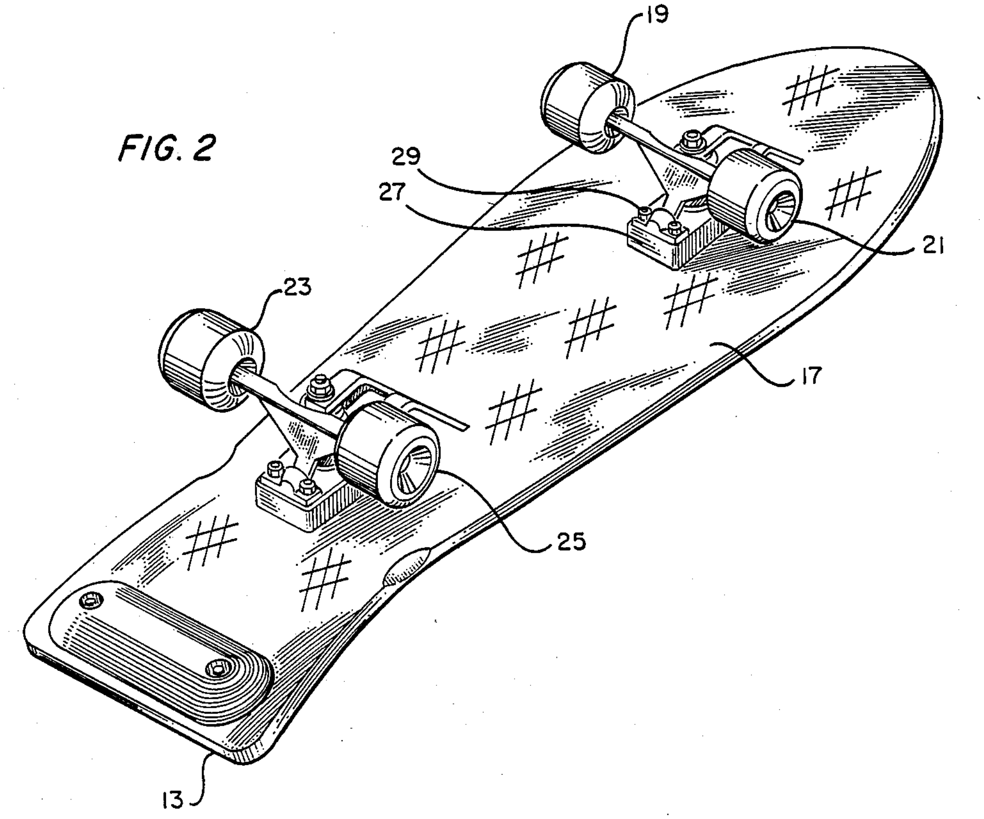
FIG. 2 is a prospective view of the skateboard of FIG. 1 showing the lower surface thereof.

FIG. 2 shows the lower surface 17 of the finished skateboard 11. Situated on the lower surface 17 are four rollers 19, 21, 23, 25. The rollers are supported on shafts, such as shaft 27 which is connected to the board lower surface 17 by connecting means, in this case bolt 29. The bolt heads are typically countersunk into recesses in the upper surface 15 of the board and pass through the board to the shaft assemblies 27. A nut engages the shaft assembly so that the shaft and associated rollers are rigidly fixed to the board 13.

Figure 3:
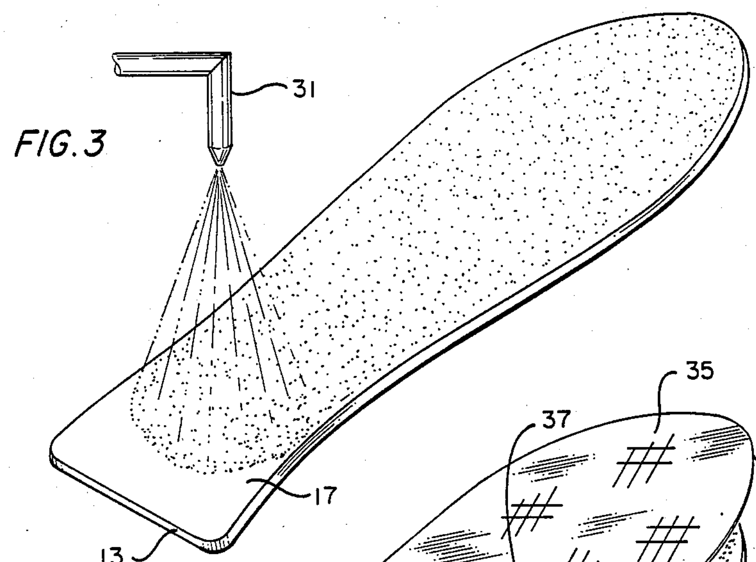
FIG. 3 is a schematic view of the first step of the method of the invention in which an adhesive is applied to the board lower surface.
Figure 4:
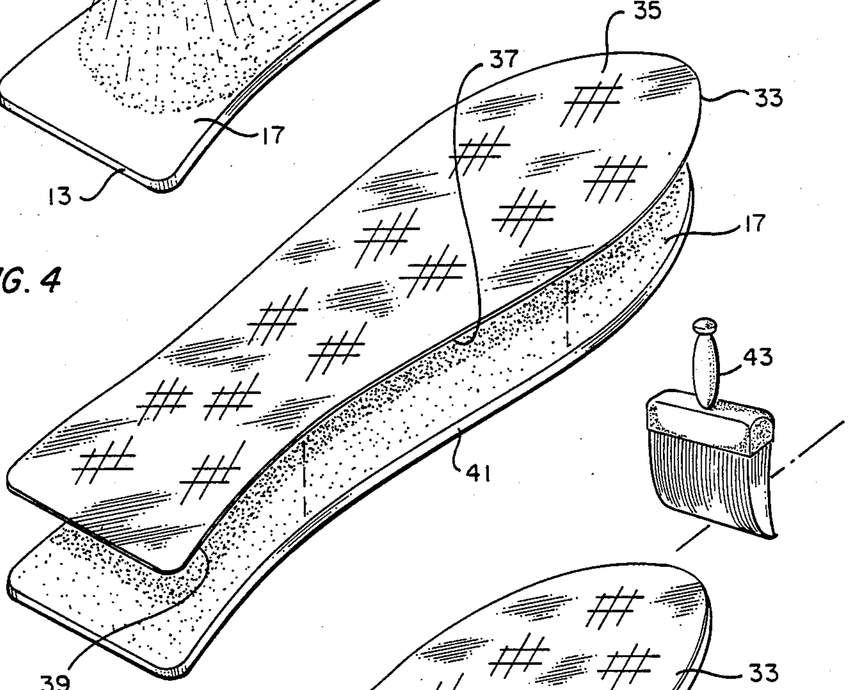
FIG. 4 schematically illustrates the second step in the method of the invention in which a label is applied to the board lower surface.
Figure 5:
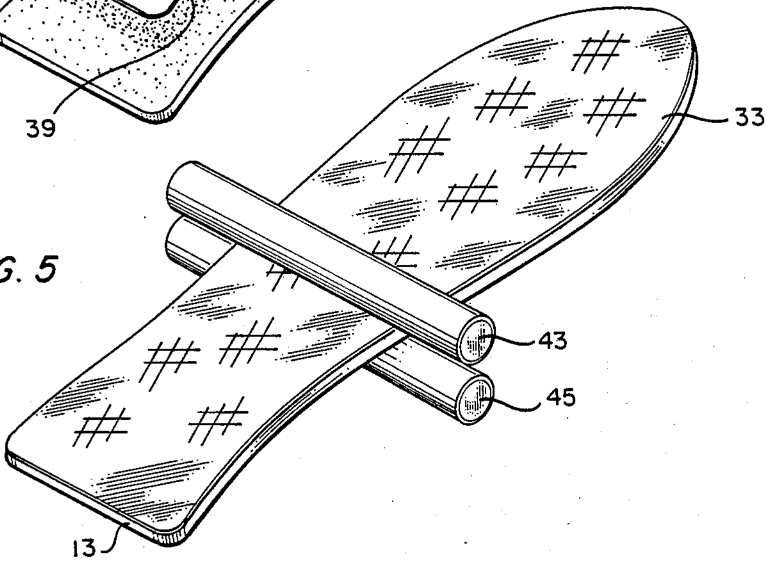
FIG. 5 schematically illustrates the next step in the method in which a compressive force and a sealant coating are applied to the label and the board.

FIGS. 3–5 illustrate one method for applying a decorative marking to the lower surface 17 of the skateboard 11. In the first step of the method, a board such as wooden board 13 is sanded to provide a smooth surface on the lower surface 17. An adhesive composition is then applied to the lower surface 17 by any convenient means. In FIG. 3, the adhesive is shown as being sprayed from a nozzle applicator 31. The adhesive could also be applied by means of a brush or by silkscreening a pattern of adhesive onto the board lower surface 17.

After the adhesive is applied to the lower surface 17 to form an adhesive surface thereon, a label 33 having a top surface 35 and a bottom surface 37 is applied to the board lower surface 17 the label 33 being centered on the board lower surface 17 before and during its application. The label 33 is formed from a paper substrate having a decorative image applied to the top surface 35. by a conventional printing process such as by offset printing. It will be noted that the label 33 has an outer periphery 39 which exactly matches and mates to the contour of the outer periphery 41 of the board 13. In this way, the label 33 substantially covers the entire lower surface 17 of the board 13.

A compressive force is then applied to the label and board to smooth out and improve the adherence of the label to the board. This can be accomplished by passing the board 13 and label 33 through a pair of horizontally oriented press rollers 43, 45.

A sealant coating is then applied to the label and board to protect the label 33. This can be accomplished by applying a lacquer finish to the board and label by means of a brush 43. Alternatively, the sealant coating could be applied by spraying or dipping the board and label.

It will be appreciated from the foregoing that the label 33 could be provided with a peel-off adhesive backing, thereby eliminating the necessity of first spraying on an adhesive. For instance, press-on adhesive labels with peel-off backings are commercially available from Avery Commercial Products Division, Azusa, Calif. The top surface 35 of such label stock could be printed using conventional printing techniques and the backing removed and label applied to the board lower surface 17 as shown in FIG. 4. The particular ink utilized for printing the label 33 can be any commercial printing ink which will withstand the application of the solvents present in traditional varnish finishes. A number of commercially available U.V. inks can be utilized which are familiar to those skilled in the art.

In another variation of the method of the invention, the label 33 is provided with a top surface 35 having a metallic laminated finish. After applying an adhesive backing and press fitting the label 33 to the board lower surface 17, the pre-printed label surface 35 can be silkscreened in traditional fashion to provide a further decorative finish to the label. The label would then be lacquered to preserve the image.

While the invention has been shown in only two of its forms, it is not thus limited but is susceptible to various changes and modifications without departing from the spirit thereof.

I claim:

1. A method of manufacturing a skateboard of the type having an upper surface on which the user stands and having a contoured lower surface provided with rollers which support the board to permit the board to travel with the user thereon, the lower surface also having a decorative marking applied thereto, the method comprising the steps of:

applying a label to the board lower surface by means of a suitable adhesive, the label having an outer periphery which matches the contours of the board lower surface so that the label substantially covers the board lower surface when applied thereto; and applying a sealant coating to the label and board to protect the label.

2. The method of manufacturing a skateboard of claim 1, wherein an adhesive is first applied to the board lower surface to form an adhesive surface thereon and the label is then applied to the adhesive surface

3. The method of manufacturing a skateboard of claim 1, wherein the label is provided with a peel-off adhesive backing.

4. The method of manufacturing a skateboard of claim 1, wherein the label is formed from a paper substrate having a decorative image printed thereon by means of a conventional printing process.

5. A method of manufacturing a skateboard of the type having an upper surface on which the user stands and having a contoured lower surface provided with rollers which support the board to permit the board to travel with the user thereon, the lower surface also having a decorative marking applied thereto, the method comprising the steps of:

applying an adhesive to the lower surface of the board to form an adhesive surface thereon;

centering a label on the adhesive surface, the label having an outer periphery which matches the contours of the board lower surface so that the label substantially covers the board lower surface when applied thereto;

applying a compressive force to the label and board to smooth out and improve the adherence of the label to the board; and applying a sealant coating to the label and board to protect the label.

6. The method of manufacturing a skateboard of claim 5, wherein the label is provided with a decorative image pre-printed thereon by means of a conventional offset printing process.

7. The method of manufacturing a skateboard of claim 5, wherein the label is formed from a paper substrate having a top surface with a decorative image preprinted thereon by means of a conventional printing process, and wherein the label top surface is thereafter silkscreened with a further decorative image.

8. The method of claim 5, wherein the compressive force is applied by passing the label and board through a set of rollers which exert a compressive force on the label and board.

9. The method of claim 8, wherein the label is printed with a U.V. printing ink which is selected to withstand the sealant coating which is subsequently applied to the board and label.

10. A method of manufacturing a skateboard of the type having an upper surface on which the user stands and having a contoured lower surface provided with rollers which support the board to permit the board to travel with the user thereon, the lower surface also having a decorative marking applied thereto, the method comprising the steps of:

applying an adhesive to the lower surface of the board to form an adhesive surface thereon;

centering a pre-printed label on the adhesive surface, the pre-printed label having printed thereon a decorative image and having an outer periphery which matches the contours of the board lower surface so that the pre-printed label substantially covers the board lower surface when applied thereto;

applying a compressive force to the label and board to smooth out and improve the adherence of the label to the board; and applying a lacquer finish to the label and board to protect the pre-printed label.

* * * * *